United States Patent
Banerjee et al.

(10) Patent No.: US 8,386,717 B1
(45) Date of Patent: Feb. 26, 2013

(54) METHOD AND APPARATUS TO FREE UP CACHE MEMORY SPACE WITH A PSEUDO LEAST RECENTLY USED SCHEME

(75) Inventors: Anindya Banerjee, Pune (IN); Niranjan Pendharkar, Pune (IN); Michael Patrick Wahl, Georgetown, TX (US)

(73) Assignee: Symantec Corporation, Mountain View, CA (US)

( * ) Notice: Subject to any disclaimer, the term of this patent is extended or adjusted under 35 U.S.C. 154(b) by 349 days.

(21) Appl. No.: 12/877,209

(22) Filed: Sep. 8, 2010

(51) Int. Cl.
G06F 12/00 (2006.01)
G06F 13/00 (2006.01)
G06F 13/28 (2006.01)

(52) U.S. Cl. .................................. 711/136; 711/118

(58) Field of Classification Search .................. None
See application file for complete search history.

(56) References Cited

U.S. PATENT DOCUMENTS

| | | | |
|---|---|---|---|
| 5,710,916 A * | 1/1998 | Barbara et al. ........................... 1/1 |
| 7,516,275 B2 * | 4/2009 | DeMent et al. ............... 711/128 |
| 8,180,969 B2 * | 5/2012 | Moyer ........................... 711/136 |
| 2011/0066808 A1 * | 3/2011 | Flynn et al. .................... 711/118 |
| 2012/0221774 A1 * | 8/2012 | Atkisson et al. ............... 711/103 |

* cited by examiner

Primary Examiner — Matthew Bradley
Assistant Examiner — Rocio Del Mar Perez-Velez
(74) Attorney, Agent, or Firm — Campbell Stephenson LLP

(57) ABSTRACT

A mechanism is provided for identifying data that can be removed from a cache memory by determining a memory region of the cache that is less recently accessed than other memory regions in the cache. A tree data structure is used to store a mapping of storage volume data locations to cache data locations. A counter reflecting recency of access to the cache data location is associated with each entry. The counter is incremented, along with counters associated with keys leading to a node including the entry, with each access to the associated cache memory location, while other counters in each affected node are decremented. Advantages of the tree data structure are used to efficiently locate a cache memory location associated with a counter reflecting a less recently accessed state in order to make that cache memory location available for storage of recently accessed data from the storage volume.

20 Claims, 7 Drawing Sheets

METHOD AND APPARATUS TO FREE UP CACHE MEMORY SPACE WITH A PSEUDO LEAST RECENTLY USED SCHEME

FIELD OF THE INVENTION

The present invention relates to the field of data storage, and particularly to freeing up cache memory space in a cache memory associated with a data source such as a storage volume.

BACKGROUND OF THE INVENTION

An ever-increasing reliance on information and computing systems that produce, process, distribute, and maintain such information in its various forms continues to put great demands on techniques for providing data storage and access to that data storage. Today's data centers and cloud computing environments require increased input/output (I/O) performance to support large-scale applications such as databases, web servers, e-commerce applications, file servers, and electronic mail. These applications typically accommodate a large number of end-users. To meet service requirements of these end-users, data center operators deploy servers with high I/O throughput. The larger the number of end-users on the servers translates to an increase in the number of I/O operations required from these servers. As a consequence, servers are often maintained at low storage capacity utilization in order to meet the required number of I/Os, which is an inefficient use of resources.

Solid state drives (SSD) are storage devices capable of high I/O performance. An SSD uses flash components to store data and, unlike a hard disk drive (HDD), has no moving parts and no rotating media. SSDs offer a higher read bandwidth, higher I/Os per second, better mechanical reliability than HDDs, and higher resistance to shock and vibrations. But SSDs have more limited capacity than do HDDs, and therefore generally cannot be used as a replacement for HDDs in a data center.

SSDs and other similar memory devices can, however, be used to improve I/O performance of data center servers by functioning as a caching layer between HDDs, storage volumes including HDDs, or other stored data sources, and server main memory. Stored data can be copied to an associated cache (e.g., an SSD) upon access of that data in order to improve the speed of subsequent access to that data. But since the cache will generally not have the same storage capacity as the associated HDD or storage volume, the cache memory will ultimately cease to have sufficient free space to copy newly accessed data. A mechanism for efficiently identifying areas of memory in the cache to make available is therefore desirable.

SUMMARY OF THE INVENTION

Embodiments of the present invention identify data that can be removed from a cache memory by locating a memory region of the cache that is less recently accessed than other memory regions in the cache. Embodiments of the present invention provide this functionality by using a tree data structure, such as a B+ tree, to store mapping of storage volume data locations to cache data locations. A counter is associated with each entry. The counter reflects how recently accessed the cache data location is. Embodiments of the present invention increment the counter, along with counters associated with keys leading to a node including the entry, with each access to the associated cache memory location. Embodiments of the present invention also decrement other counters found in the same node of the tree data structure as the incremented entries. Embodiments of the present invention further use advantages of the tree data structure to efficiently locate a cache memory location associated with a counter reflecting a less recently accessed state in order to make that cache memory location available for storage of recently accessed data from the storage volume.

In one embodiment of the present invention, a mapping entry that includes a mapping of a storage volume data location to a cache memory location is stored in a first node of a tree data structure, data from the storage volume data location is stored at the cache memory location, that data stored in the cache memory location is accessed, and in response to that access, counters associated with the mapping entry and others are modified. In this embodiment, these modifications include incrementing a counter stored with the mapping entry, decrementing each counter stored with each of a plurality of mapping entries also stored in the first node, incrementing a counter stored in association with a key entry linked to the first node in a parent node of the first node, and decrementing each counter stored with each other key entry stored in the parent node.

In one aspect of the above embodiment, a less recently accessed cache memory location is found. The less recently accessed cache memory location is associated with a mapping entry stored with a smallest counter value as compared to other mapping entries in the tree data structure. In a further aspect, the less recently accessed cache memory location is found by searching a node of the tree data structure for an entry stored with a smallest counter value. If the node is a leaf node of the tree data structure, then the cache memory location stored in the entry is identified. If the node is not a leaf node of the tree data structure, then a key in the entry is identified, and that key is followed to an associated child node in the tree data structure, and the searching process is repeated.

In another further aspect, the finding of a less recently accessed cache memory location is performed in response to receiving a request to store additional data from the storage volume in the cache, but insufficient free space is available to store that additional data. Once the less recently accessed cache memory location is found, the entry stored with the smallest counter value is deleted from the tree data structure, the additional data is stored at the cache memory location associated with the now deleted entry, a new mapping entry is stored in the tree data structure along with a new counter. In an additional aspect, a parent node key entry counter associated with the node that contained the now deleted entry is incremented.

In another aspect of the above embodiment, incrementing the counter stored with the mapping entry involves adding a counter incrementation value to the counter stored with the mapping entry, in which the counter incrementation value is proportional to the number of entries comprising the plurality of entries. In a different aspect of the above embodiment, incrementing the counter stored with the mapping entry involves setting the counter to a predetermined maximum value.

In another aspect of the above embodiment, the incrementing and decrementing of key counter values continues through the tree data structure from the node containing the entry to the root node of the tree data structure.

The foregoing is a summary and thus contains, by necessity, simplifications, generalizations and omissions of detail. Consequently, those skilled in the art will appreciate that the Summary is illustrative only and is not intended to be in any way limiting. Other aspects, inventive features, and advantages of the present invention, as defined solely by the claims, will become apparent in the non-limiting Detailed Description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention identify data that can be removed from a cache memory (e.g., solid state drive cache) by determining a memory region of the cache that is less recently accessed than other memory regions in the cache. Embodiments of the present invention provide this functionality by using a tree data structure, such as a B+ tree, to store mapping of storage volume data locations to cache data locations. A counter is associated with each entry. The counter reflects both recency and frequency of access to the cache data location. Embodiments of the present invention increment the counter, along with counters associated with keys leading to a node including the entry, with each access to the associated cache memory location. Embodiments of the present invention also decrement other counters found in the same node of the tree data structure as the incremented entries. Embodiments of the present invention further use advantages of the tree data structure to efficiently locate a cache memory location associated with a counter reflecting a less recently accessed state in order to make that cache memory location available for storage of recently accessed data from the storage volume.

Figure 1:
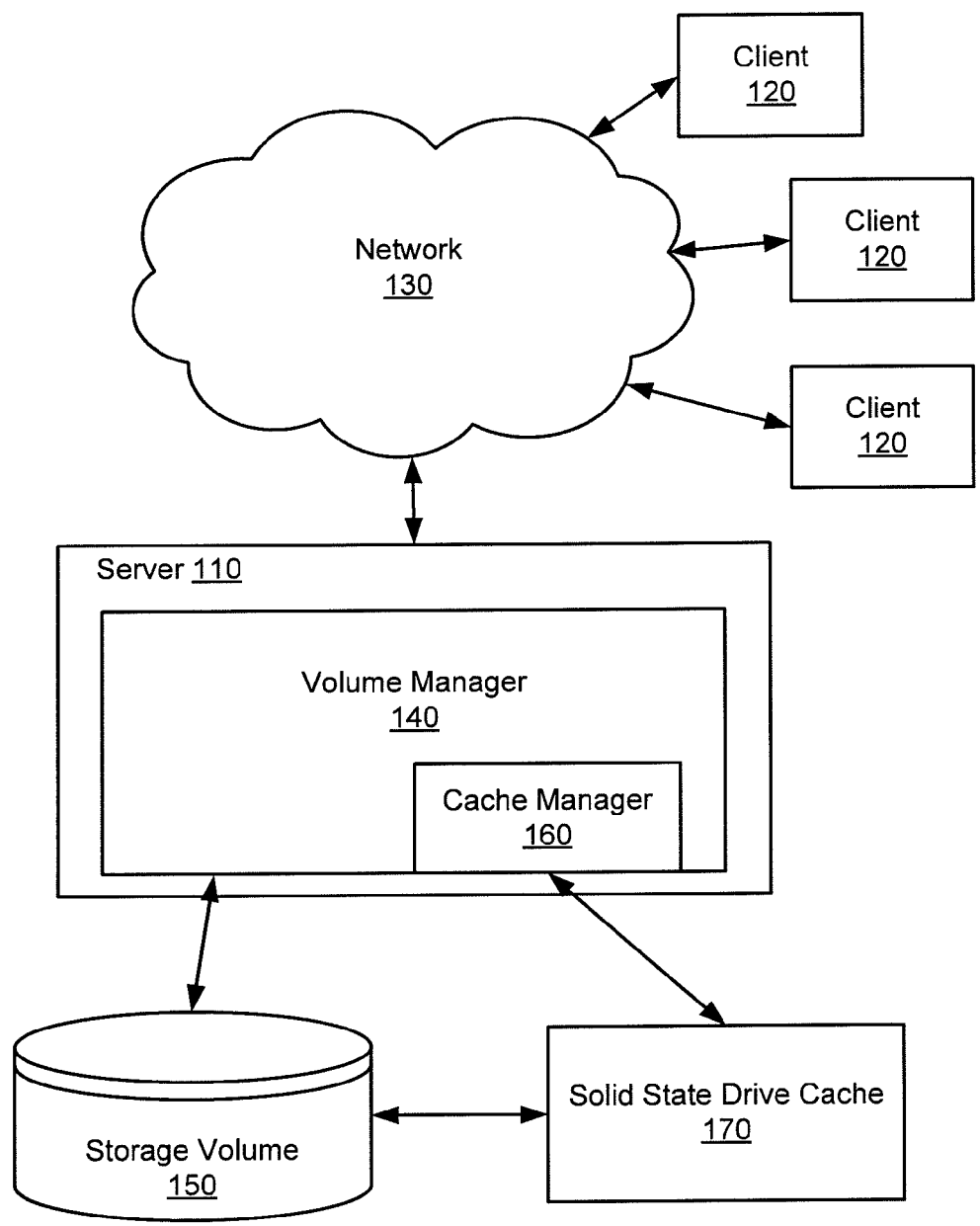
FIG. 1 is a simplified block diagram illustrating an example of a system incorporating a solid state drive cache, in accord with embodiments of the present invention.

FIG. 1 is a simplified block diagram illustrating an example of a system incorporating a SSD cache, in accord with embodiments of the present invention. A server 110 hosting a mechanism for providing access to disk volumes or file systems on disk volumes (e.g., volume manager 140) is coupled to one or more client computers 120 via a network 130. Embodiments of network 130 can include, for example, a local area network, metro area network, wide area network, storage area network, or any combination thereof. Embodiments of the present invention are not limited by the type or protocols of communication for network 130. Server 110 can provide access to disk volume or file system space either to directly-coupled disk volumes or by disk volumes that are served to server 110 via a storage area network, network attached storage, a storage appliance, and the like.

As illustrated, server 110 hosts a volume manager 140 that provides access to a storage volume 150. Storage volume 150 can include one or more physical hard disk drives (HDD) and data stored thereon. Volume manager 140 also provides, via cache manager 160, access to a solid state drive (SSD) cache 170. The SSD cache is configured to store data accessed from storage volume 150 and to be the source of that data for subsequent accesses to that data until that data is removed from the SSD cache. Typically, the SSD cache will be as large as 10% of the storage size of an associated storage volume, and will therefore not have capacity to store all of the data stored on the associated storage volume. Thus, a mechanism for identifying candidate data to be removed from the SSD cache when no longer needed, or when not accessed recently, is desirable.

It should be noted that while examples provided herein discuss use of a cache memory device (e.g., a SSD cache), embodiments of the present invention are not limited to any specific storage cache. A variety of storage caches can be used in association with embodiments of the present invention.

Figure 2:
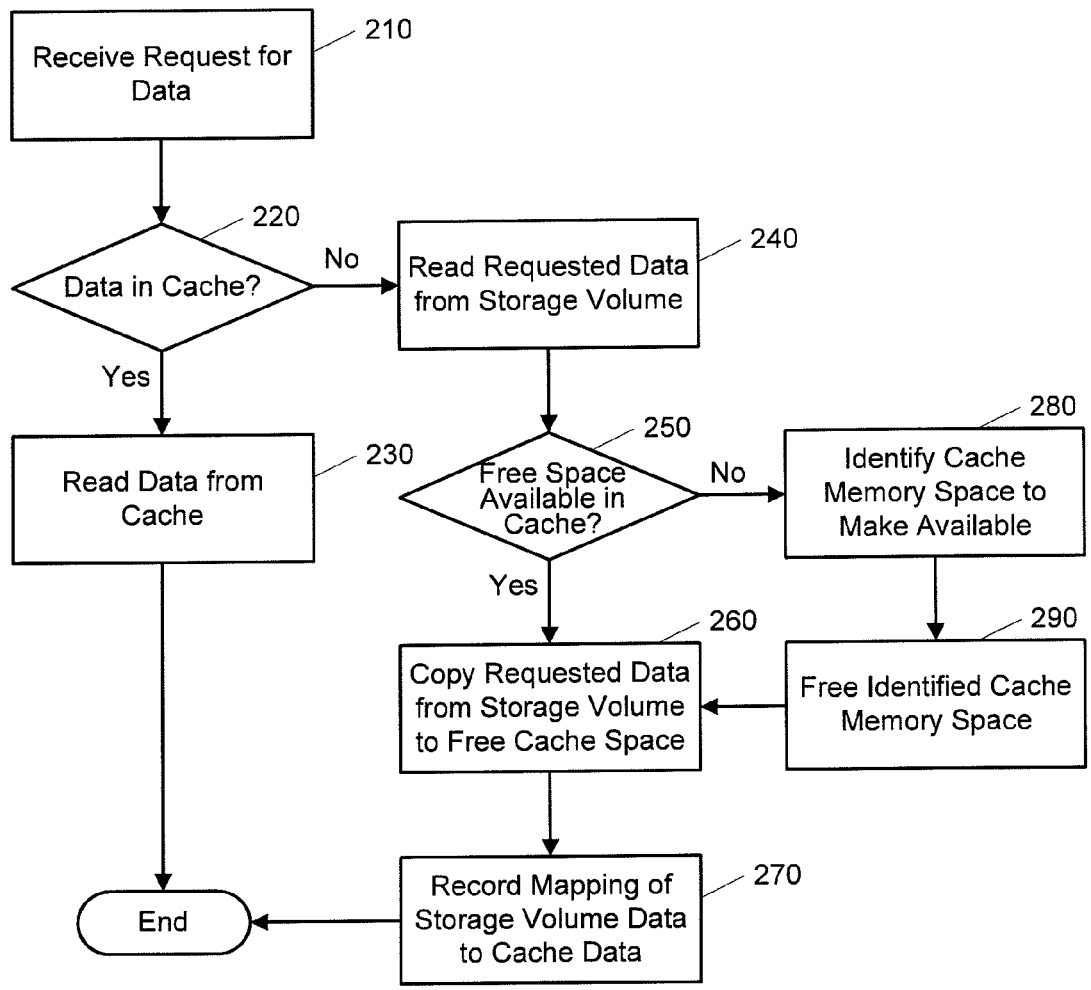
FIG. 2 is a simplified flow diagram illustrating a method for accessing data in a data caching system, in accord with embodiments of the present invention.

FIG. 2 is a simplified flow diagram illustrating a method for accessing data in a data caching system, in accord with embodiments of the present invention. A request is received for data stored in a storage volume (e.g., storage volume 150) (210). The data request can be received from, for example, any one of clients 120 or a user accessing server 110 in another manner. The request can be received by, for example, a volume manager 140. A determination is then made as to whether the requested data is located in the cache (e.g., SSD cache 170) (220). Such a determination can be performed by checking a mapping table that includes entries associating storage blocks from the storage volume to memory locations in the cache. Such a mapping table can be maintained, for example, by cache manager 160, which can also perform the table lookup. If the requested storage volume data locations are mapped to the cache, then the requested data can be read from the cache memory (230). Once the data is read from the cache memory, that data can be provided by the server to the requesting entity.

If the mapping table lookup does not provide a corresponding memory location in the cache, this means that the requested data has not previously been provided to the cache or the cache currently does not have the requested data stored therein. The requested data can then be read from the storage volume and provided to the requesting entity (240). The read can be performed as with any normal read through the use of disk calls provided by, for example, volume manager 140 to storage volume 150. If the requested data should be cached, then a determination is made as to whether there is sufficient free memory space available in the cache to store the data read from the storage volume (250). If sufficient free space is available, then the data read from the storage volume is copied to the free space in the cache memory (260). The mapping table is then updated to include an entry identifying the memory location from the hard disk drive and identifying the location in the cache memory where the cached image is stored (270).

If sufficient free space for the data read from the disk volume is not found (250), then cache memory space is identified for freeing up so that the new data can be stored in the cache (280). As will be discussed in further detail below, one method of identifying cache memory space to free up involves determining that cache space that has less recently been accessed. Once the cache memory space to be freed up has been identified, the cache manager can delete the data stored in the identified cache space and the entry associated with the freed up cache memory space in the mapping table can be deleted (290). At this point, the cache manager, for example, can perform the tasks related to copying data from the storage volume to the freed up space in the cache (260) and record the mapping of the hard disk drive storage space to the solid state drive storage space (270).

In this manner, data can be read from the cache memory in order to provide quick I/O response times. If the data is not available in the cache memory, the data can be accessed from the hard disk drive and then stored in an appropriate location in the cache memory. It should be noted, that the structures referenced above for both FIGS. 1 and 2 for performing the various tasks in FIG. 2, are provided by nature of an example only. Alternate structures and devices can perform the tasks or part thereof. Embodiments of the present invention are not limited to the structures discussed above.

Identifying and Freeing Up Cache Memory Space

In order to track the mappings from data storage space in a storage volume and associated data storage space in a cache, a mapping table is maintained. An index to the mapping table can be the storage volume storage location. In this manner, when data stored in the storage volume is requested, the data location can rapidly be searched to determine whether the storage volume data has already been stored on the solid state drive. One example of a data structure that can be used to efficiently store entries of such a mapping table is a tree data structure, such as a B+ tree. Given the large number of entries that can be present in such a mapping table because of the size of the solid state drive and the number of data blocks present in the storage volume, a tree data structure provides a flexible and efficient data storage mechanism for referencing the information in the mapping table. The mapping table tree data structure can be stored either in memory of the server providing access to the cache storage or in the cache memory itself for quick access.

Figure 3A:
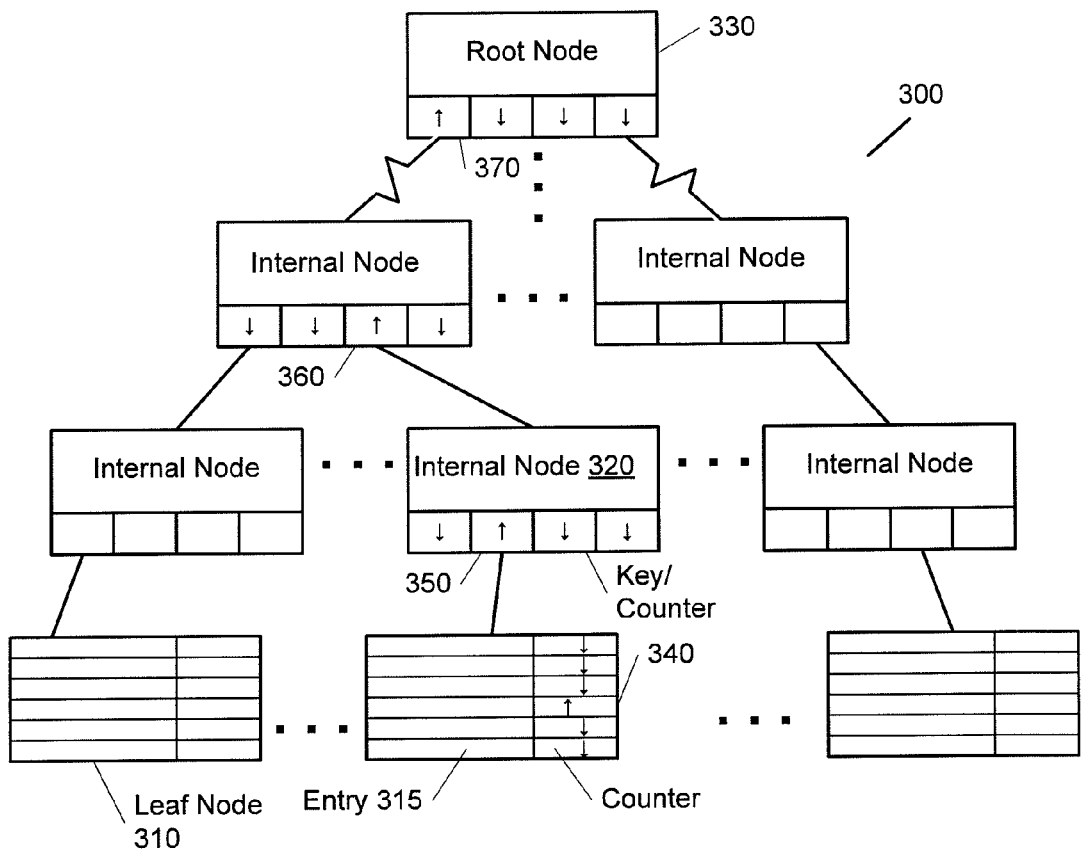
FIG. 3A illustrates an example B+ tree data structure 300 that can be used in conjunction with embodiments of the present invention.

FIG. 3A illustrates an example B+ tree data structure 300 that can be used in conjunction with embodiments of the present invention. A B+ tree has three types of nodes: a leaf node 310, an internal node 320, and a root node 330. In a B+ tree, all records are stored at the leaf node level of the tree, while keys to lower level nodes (child nodes) are stored in the internal nodes. Thus, each entry of the mapping table would be located as an entry in a leaf node. Each leaf node can be linked to one another as a linked list, thereby making range queries or an ordered iteration through the leaf node entries simpler and more efficient. In a typical B+ tree, each internal node contains a key pointer to one or more child nodes of that internal node. A root node is the top level internal node that can contain two or more key pointers to child nodes in the level immediately beneath the root node.

Embodiments of the present invention modify entries and keys stored in a typical tree data structure, such as that illustrated by FIG. 3A, by including a counter reflecting recency of access to data associated with an entry or to a child node, respectively. These counters are used in conjunction with a pseudo least recently used (PLRU) algorithm to gauge the access "temperature" of entries in the tree data structure. Each time data stored in the cache memory is accessed, the associated entry and all of the key entries in the path to that entry from the root node have their corresponding counters increased. All other entries in each tree node on the path have their counters reduced. In order to identify a memory location in the cache to make available, the tree data structure is traversed through a path of least values of the counters associated with the keys.

FIG. 3A illustrates an example of increasing and decreasing counters associated with entries in a tree data structure. Leaf node 310 contains a plurality of entries 315. Each entry has an associated counter. When a cache memory location associated with entry 340 is accessed, the counter associated with entry 340 is incremented (reflected in FIG. 3A by an up arrow). As the counter for entry 340 is increased, counters associated with each other entry in the leaf node are decreased (reflected in FIG. 3A by a down arrow). Similarly, a key entry counter 350 in parent internal node 320 is also incremented (reflected in FIG. 3A by an up arrow). Also, counters associated with all other keys in internal node 320 are decremented (reflected in FIG. 3A by a down arrow). This incrementing and decrementing of counters associated with keys is reflected in each parent node along the path to the root node 330 (e.g., key counter 360 and key counter 370 being incremented). Schemes used for incrementing and decrementing the various counters will be discussed in greater detail below. An advantage of using counters rather than time stamps to identify a less recently accessed memory location is that a counter can require significantly fewer bits than a time stamp, and therefore be more resource conservative in a large tree data structure.

Figure 3B:
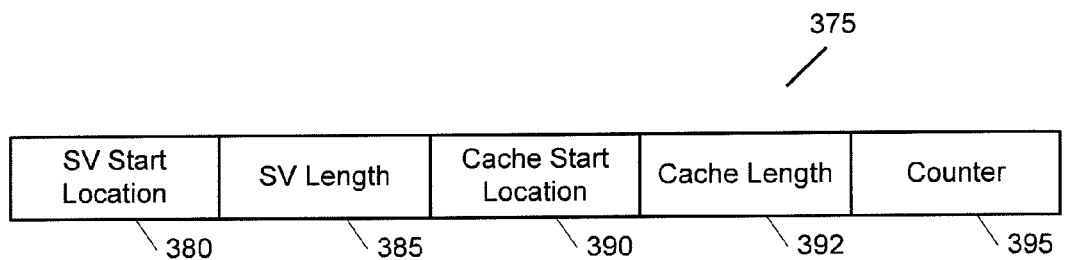
FIG. 3B illustrates an example of data that can be contained in a leaf node entry 350, in accord with embodiments of the present invention.

FIG. 3B is an example of data that can be contained in a leaf node entry 375, in accord with embodiments of the present invention. A value representing the hard disk drive or storage volume starting block (380), which can also be the index value of the mapping table, a length or number of blocks of the data found on the hard disk drive or storage volume (385), the cache starting memory location (390), the cache length or number of blocks (392), and the counter (395). In a typical B+ tree used to track mapping for an SSD cache, a leaf node can have on the order of 350 entries, while each internal node can have on the order of 350 keys pointing to child nodes.

As discussed above, when data associated with a leaf node entry is accessed, the counters of both the accessed entry and other entries in that leaf node and in parent and grandparent nodes leading to the root node are modified. Specifically, the leaf node entry counter associated with the accessed data is incremented. Similarly, counters associated with keys pointing toward the leaf node in the parent-grandparent tree are also incremented. Further, counters associated with all other entries and all other key entries in the affected nodes are decremented. Thus, accessing data has a local effect on other entries in the node, rather than a global effect on the entire tree data structure.

A variety of incrementing and decrementing schemes can be used in association with embodiments of the present invention. Choice of an appropriate scheme relates to the goal of determining a memory location to make available in the cache memory represented by the tree data structure. Thus, one goal should be to ensure that not too many counters are at a lowest value (e.g., zero). One mechanism for providing such a result is to increment counters by an incrementation value proportional to a number of entries present in a particular node of a tree data structure. The incrementation value can be different for each node in the tree data structure, depending upon a number of entries or key entries stored by that node. Alternatively, during any access to data associated with a leaf node entry, the counter can be set to a maximum value. Similarly, all key entries leading to the root can also have their access counters updated to the maximum value. The "maximum value" can be predetermined based on a size of the tree and expected number of accesses to memory areas in the cache.

A scheme for decrementing the non-accessed entries and key entries also takes into consideration a desire to not have a large number of entries at a zero value. A minimum value for all the counters of entries present in a node can be determined. When a counter for an entry is to be decremented, the decrementation value can be either min(counters in node)-min (counters in parent) or the value 1, whichever is greater. In this manner, counters in nodes not affected by a prior change can be adjusted for those prior changes in a current change.

For example, consider a parent node N0 with two child nodes, N1 and N2. Each of N1 and N2 have two entries, and since N0 has two children, it also has two key entries. At an initial time T0, all the counters are at a maximum value, for example, 5, so min(N0)=min(N1)=min(N2)=5. If an access to one entry represented in N1 occurs at a subsequent time T1, the entries in N1 and also N0 will be updated (e.g., the counter associated with the accessed entry in N1 will still be at the maximum [5] and the counter associated with the non-accessed entry will be decremented by 1, similarly, the key counter in N0 associated with N1 will be at maximum and the key counter associated with N2 will be decremented by 1). Thus, the minimums of counters in the nodes are now: min (N0)=min(N1)=4; min(N2)=5. After another access to the first entry in N1 (e.g.; at time T2), the counter minimums are now: min(N0)=min(N1)=3; min(N2)=5.

At this point there have been accesses in the tree which are not taken into account in N2. To compensate for the growing disparity in the counters, at the next access of an entry represented in N2 (e.g., at time T3) the non-accessed entry counters are decremented by min(N2)-min(N0)=5-3=2. Thus, after access and decrementation, the adjusted counter minimums will be, min(N0)=4; min(N1)=min(N2)=3 (if upon access a counter is set to a maximum value [e.g., 5]). In this manner, non-local changes to counters in the tree data structure are taken into account in a global manner.

Figure 4:
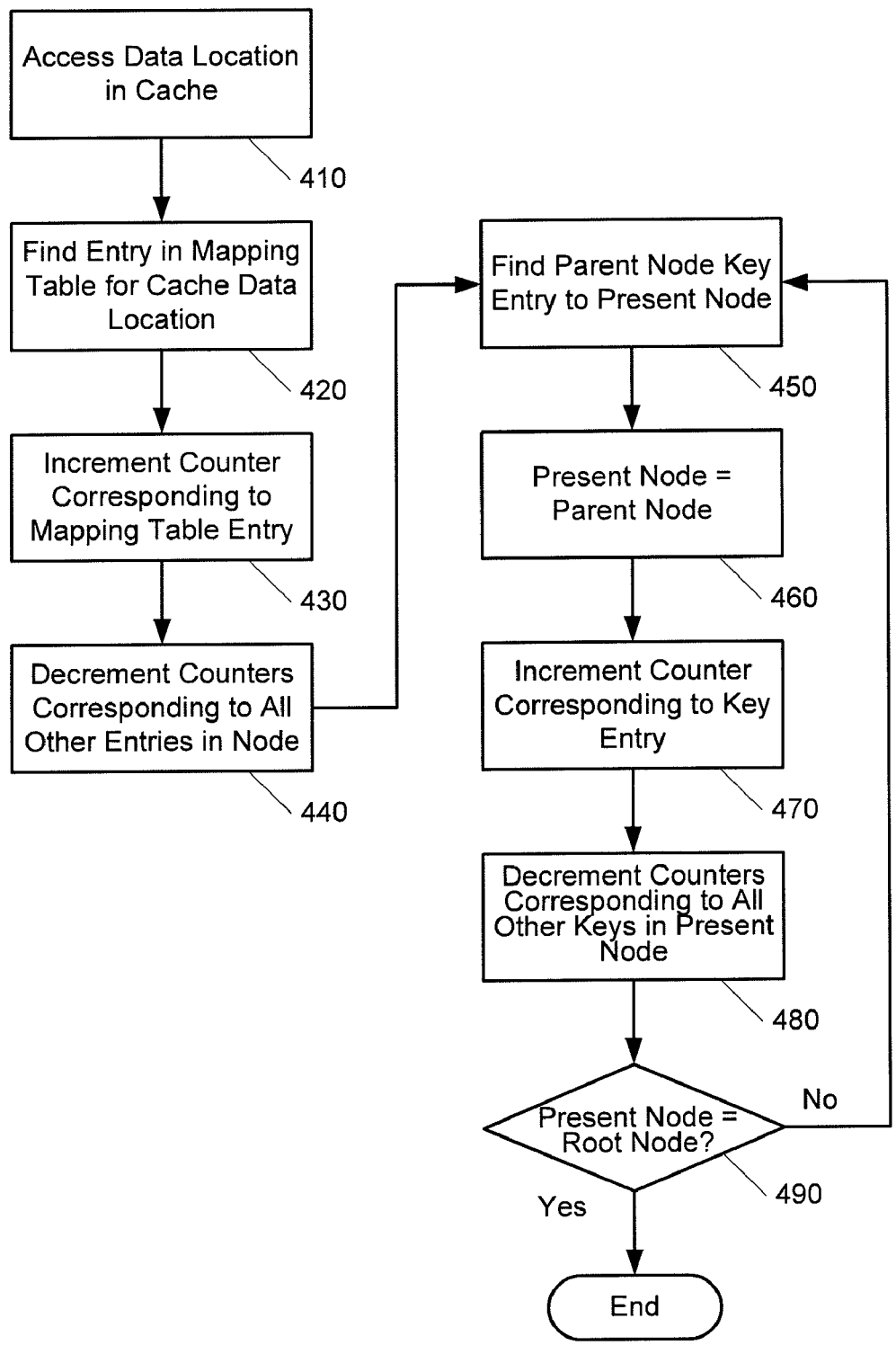
FIG. 4 is a simplified flow diagram illustrating an example of a process for identifying cache space to make available, in accord with embodiments of the present invention.

FIG. 4 is a simplified flow diagram illustrating a process for updating a tree data structure in response to accessing data associated with an entry in a mapping table, in accord with embodiments of the present invention. Data stored in a cache memory represented by a mapping table stored in the tree data structure is accessed (410). Such an access can be either a read, a write, or an update of that stored data. A search of the mapping table is then performed to find an entry in the mapping table corresponding to the cache data location (420). The counter associated with the mapping table entry is then incremented (430). This incrementation of the counter can be performed in accord with one of the incrementation schemes discussed above. Counters corresponding to all other entries in the node containing the entry in the mapping table are decremented (440). This decrementation can be performed using one of the schemes discussed above.

At this point the tree data structure is traversed to the parent of the present node and the key entry to the present node is located (450). In order to help in identifying the current node, the parent node is now considered to be the "present node" (460). The counter corresponding to the key entry of the already updated child node is incremented in accord with the scheme discussed above (470). Similarly, counters corresponding to all other keys in the present node are decremented (480). A determination can then be made as to whether the present node is the root node of the tree data structure (490). If the present node is not the root node then the process returns to step 450 to locate a parent node key entry of the present node and the process continues. If the present node is the root node then the process is over.

Figure 5:
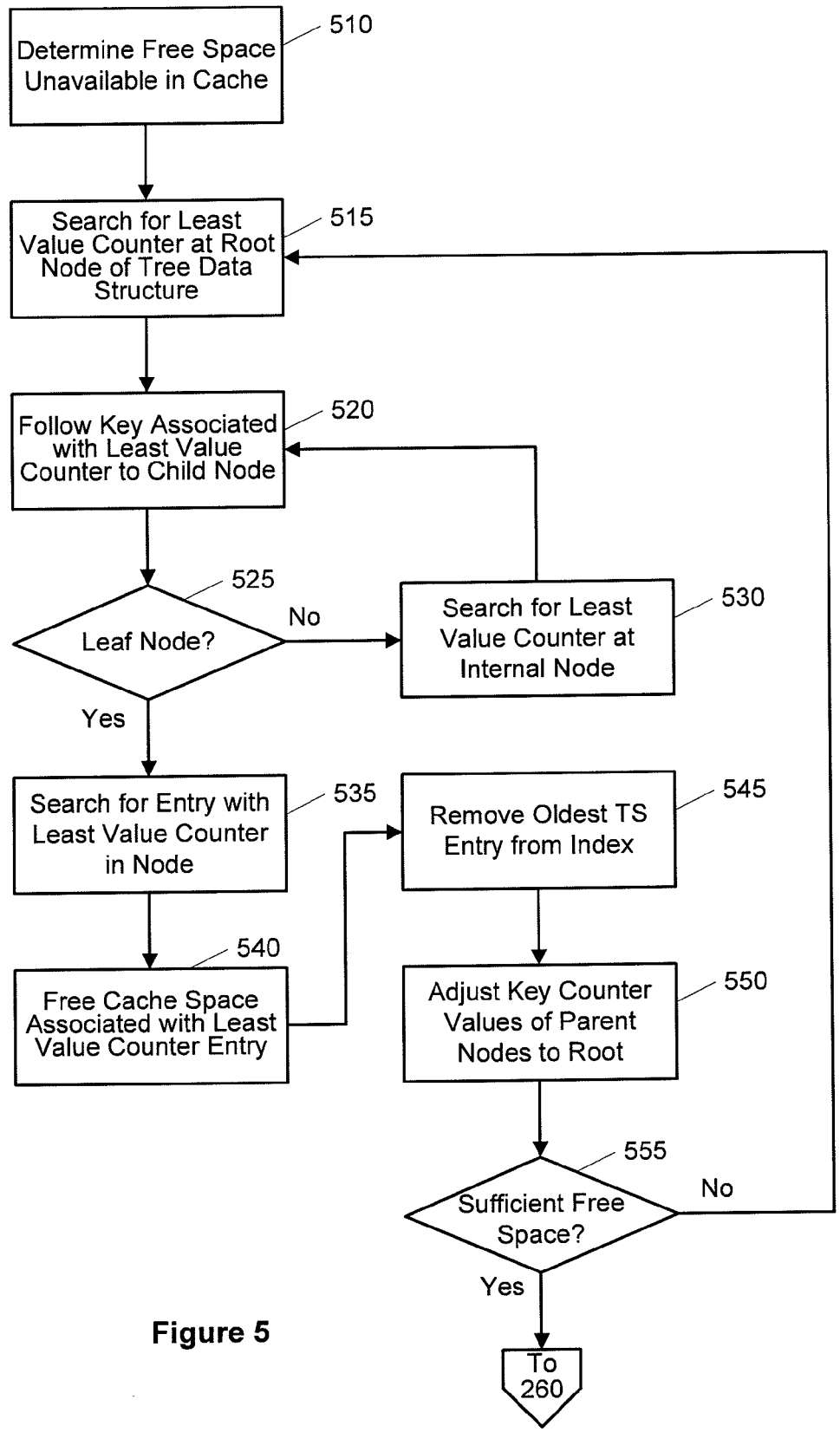
FIG. 5 is a simplified flow diagram illustrating an example of a process for identifying cache space to make available, in accord with embodiments of the present invention.

FIG. 5 is a simplified flow diagram illustrating an example of a process for identifying cache space to make available, in accord with embodiments of the present invention. This process can be used to perform a combination of steps 280 and 290 of FIG. 2.

The process illustrated in FIG. 5 can be performed in response to determining that free memory space for a newly accessed section of an associated storage volume is unavailable in a cache memory (510), or alternatively when free space in the cache has dropped below a threshold value. This step corresponds to a negative result of conditional step 250 illustrated in FIG. 2. In order to identify cache memory to make available, a search is made for a least value counter associated with a key stored in a root node of a tree data structure storing entries of a table mapping storage volume locations to cache memory locations (515). The tree data structure can be a B+ tree as illustrated in FIG. 3A, or another type of tree data structure (e.g., B-tree). Once the least value counter associated with a key is found, a pointer is followed from the key associated with that least value counter to the associated child node (520). In one embodiment, if there is more than one key with a counter value equal to the least counter value, then one of the associated keys is randomly selected. If the child node is not a leaf node (for a B+ tree) (525), key entries in the child node are searched for a least value counter (530). Once the least value counter is found, a pointer from the key associated with that least value counter is once again followed to an appropriate child node (520).

The path of internal nodes of the tree data structure is walked until a node storing mapping table entries is reached (e.g., a leaf node of a B+ tree) (525). The mapping table entries of the node are then searched for a least value counter in that node (535). Once the entry having the least value counter is located, the cache memory space associated with that entry is freed up or made available (540). This operation of freeing up or making available the cache memory space allows for subsequent writing of additional data to the identified cache memory space. The entry associated with the least value counter in the node is then removed from the index (545). Key counter values of parent nodes for the node containing the entry are then incremented and decremented according to the scheme being used for that tree data structure (550). For example, in one embodiment of the present invention, a key counter value for the leaf node containing the entry can be set to a minimum of the remaining entries in the parent node.

A determination is then made as to whether there is sufficient free cache memory space available in the cache to store the data from the associated storage volume (555). If not, then an additional search is made for a next least value counter and associated memory (515 et seq.). If sufficient free space is available in the cache, then the flow diagram illustrated by FIG. 2 continues at step 260.

This process of identifying cache space to make available for storage of new data read from the associated storage volume can be performed, for example, by a cache manager 160, as illustrated in FIG. 1. Cache manager 160 can be located on a storage server 110 or other processing device controlling the cache.

Example Computing Environment

Figure 6:
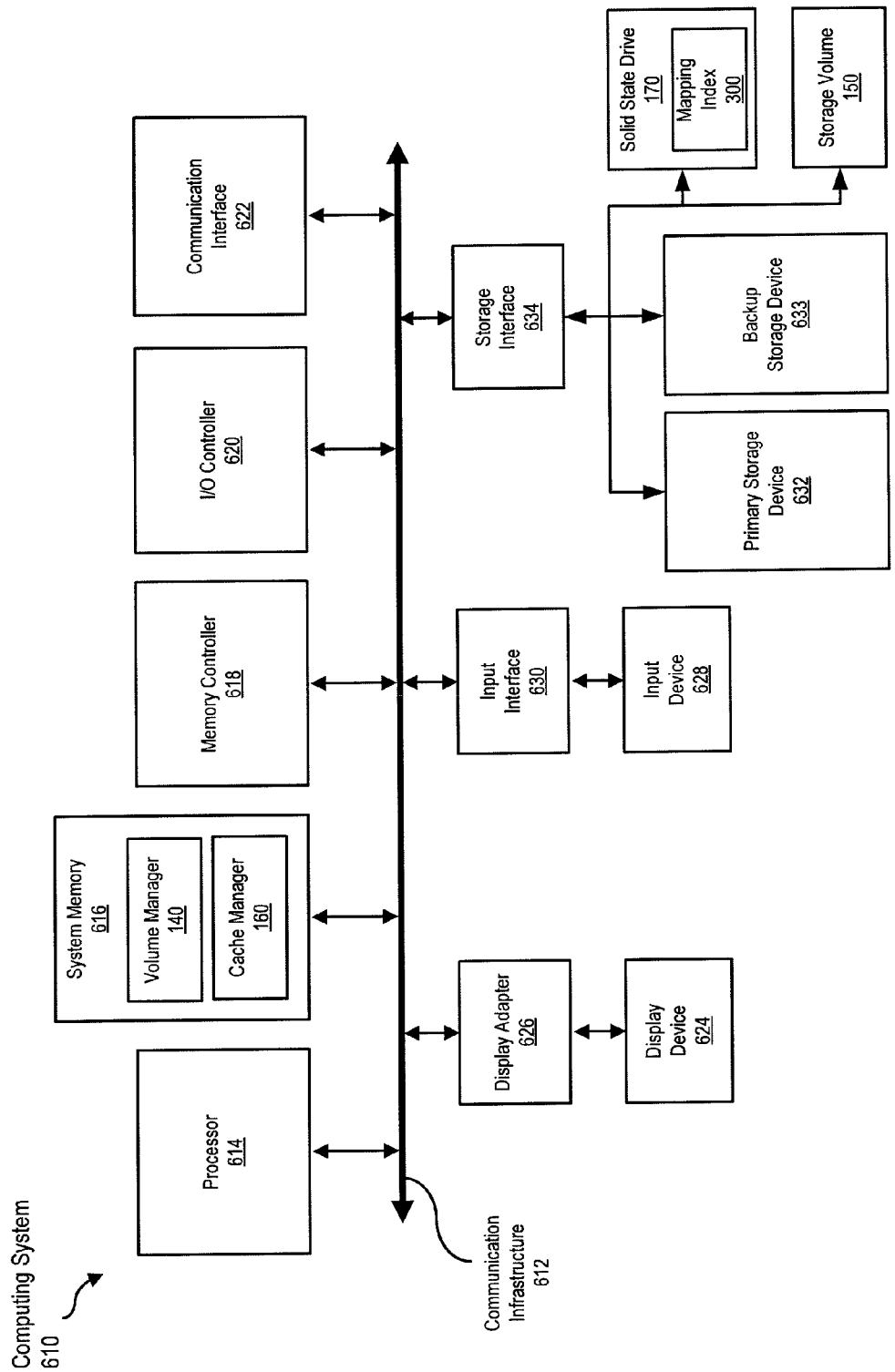
FIG. 6 is a simplified block diagram of a computing system capable of implementing embodiments of the present invention.

FIG. 6 is a block diagram of a computing system 610 capable of implementing a volume manager or a cache manager, as described above. Computing system 610 broadly represents any single or multi-processor computing device or system capable of executing computer-readable instructions. Examples of computing system 610 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 610 may include at least one processor 614 and a system memory 616. By executing the software that implements a volume manager or a cache manager, computing system 610 becomes a special purpose computing device that is configured to provide high availability of one or more applications.

Processor 614 generally represents any type or form of processing unit capable of processing data or interpreting and executing instructions. In certain embodiments, processor 614 may receive instructions from a software application or module. These instructions may cause processor 614 to perform the functions of one or more of the embodiments described or illustrated herein. For example, processor 614 may perform or be a means for performing the operations described herein. Processor 614 may also perform or be a means for performing any other operations, methods, or processes described or illustrated herein.

System memory 616 generally represents any type or form of volatile or non-volatile storage device or medium capable of storing data or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632 or solid state drive 170, as described in detail below). In one example, one or more of a volume manager 140 or cache manager 160 may be loaded into system memory 616.

In certain embodiments, computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform or be a means for performing, either alone or in combination with other elements, one or more of the operations or features described or illustrated herein.

I/O controller 620 generally represents any type or form of module capable of coordinating or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As further illustrated in FIG. 6, computing system 610 may also include at least one input device 628 coupled to communication infrastructure 612 via an input interface 630. Input device 628 generally represents any type or form of input device capable of providing input, either computer or human generated, to computing system 610. Examples of input device 628 include, without limitation, a keyboard, a pointing device, a speech recognition device, or any other input device.

As illustrated in FIG. 6, computing system 610 may also include a primary storage device 632 and a backup storage device 633 coupled to communication infrastructure 612 via a storage interface 634. Storage devices 632 and 633 generally represent any type or form of storage device or medium capable of storing data or other computer-readable instructions. For example, storage devices 632 and 633 may be a magnetic disk drive (e.g., a hard disk drive), a floppy disk drive, a magnetic tape drive, an optical disk drive, a flash drive, or the like. Storage interface 634 generally represents any type or form of interface or device for transferring data between storage devices 632 and 633 and other components of computing system 610. A storage device like primary storage device 632 can store information such as configuration information 690 (e.g., configuration information indicating the priority of applications and the number of retry attempts per application, as described above).

In certain embodiments, storage devices 632 and 633 may be configured to read from or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. For example, storage volume 150 and solid state drive 170 can be coupled to computing system 610 directly via one or more storage interfaces 634 or indirectly via a network interface (e.g., communication interface 622). Conversely, all of the components and devices illustrated in FIG. 6 need not be present to practice the embodiments described or illustrated herein. The devices and subsystems referenced above may also be interconnected in different ways from that shown in FIG. 6 or described herein.

Computing system 610 may also employ any number of software, firmware, or hardware configurations. For example, one or more of the embodiments disclosed herein may be encoded as a computer program (also referred to as computer software, software applications, computer-readable instructions, or computer control logic) on a computer-readable medium. Examples of computer-readable media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 610 for storage in memory via a network such as the Internet or upon a carrier medium. Non-transitory computer-readable media include all forms of computer-readable media except for a transitory, propagating signal.

The non-transitory computer-readable medium containing the computer program may be loaded into computing system 610. All or a portion of the computer program stored on the non-transitory computer-readable medium may then be stored in system memory 616 or various portions of storage devices 632 and 633. When executed by processor 614, a computer program loaded into computing system 610 may cause processor 614 to perform or be a means for performing the functions of one or more of the embodiments described or illustrated herein. Additionally or alternatively, one or more of the embodiments described or illustrated herein may be implemented in firmware or hardware. For example, computing system 610 may be configured as an application specific integrated circuit (ASIC) adapted to implement one or more of the embodiments disclosed herein.

Example Network Architecture

Figure 7:
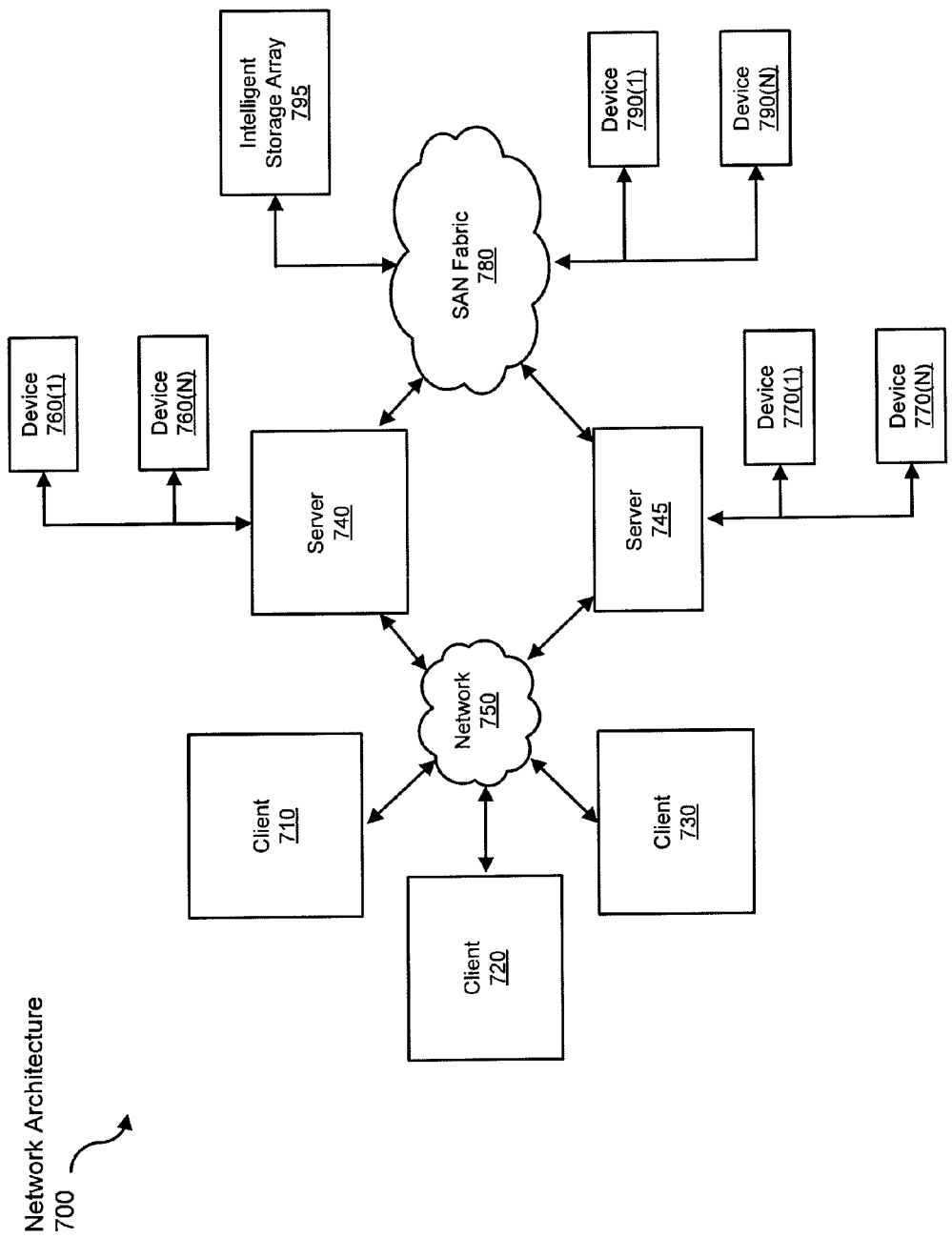
FIG. 7 is a simplified block diagram of an alternative network architecture in which embodiments of the present invention may be implemented.

FIG. 7 is a block diagram of an alternative network architecture 700 in which client systems 710, 720, and 730 (or clients 120) and servers 740 and 745 (or server 110) may be coupled to a network 750. Client systems 710, 720, and 730 generally represent any type or form of computing device or system, such as computing system 610 in FIG. 6.

Similarly, servers 740 and 745 generally represent computing devices or systems, such as application servers or database servers, configured to provide various database services or run certain software applications. Network 750 generally represents any telecommunication or computer network including, for example, an intranet, a wide area network (WAN), a local area network (LAN), a personal area network (PAN), or the Internet. In one example, client systems 710, 720, or 730 or servers 740 or 745 may include monitoring agents or decision-making agents as shown in FIGS. 1 and 2.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data or other computer-readable instructions. In certain embodiments, storage devices 760(1)-(N) and storage devices 770(1)-(N) may represent network-attached storage (NAS) devices configured to communicate with servers 740 and 745 using various protocols, such as Network File System (NFS), Server Message Block (SMB), or Common Internet File System (CIFS).

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) or an intelligent storage array 795. SAN fabric 780 may also facilitate, via network 750 and servers 740 and 745, communication between client systems 710, 720, and 730 and storage devices 790(1)-(N) or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data or other computer-readable instructions.

In certain embodiments, and with reference to computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described or illustrated herein are not limited to the Internet or any particular network-based environment.

In at least one embodiment, all or a portion of one or more of the embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein may also be encoded as a computer program, stored in server 740, run by server 745, and distributed to client systems 710, 720, and 730 over network 750.

In some examples, all or a portion of the environment illustrated in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    storing a first mapping entry comprising a mapping of a storage volume data location to a cache memory location, wherein
        the first mapping entry is stored in a first node of a tree data structure, and
        the first node of the tree data structure comprises a plurality of mapping entries;
    storing data from the storage volume data location at the cache memory location;
    accessing the data in the cache memory location; and
    in response to said accessing the data in the cache memory location,
        incrementing a counter stored with the first mapping entry,
        decrementing each counter stored with each of the plurality of mapping entries except the first mapping entry,
        incrementing a counter stored in association with a key entry linked to the first node stored in a second node wherein the second node is a parent of the first node, and
        decrementing each counter stored with each other key entry stored in the second node.

2. The method of claim 1 further comprising:
    finding a less recently accessed cache memory location wherein the less recently accessed cache memory location is associated with a mapping entry stored with a smallest counter value as compared to all other mapping entries stored in the tree data structure.

3. The method of claim 2 wherein said finding comprises:
    searching a third node of the tree data structure for an entry stored with a smallest counter value;
    if the third node is a leaf node of the tree data structure, identifying the cache memory location stored in the entry; and
    if the third node is not a leaf node of the tree data structure, identifying the key in the entry, following the key to a child node of the tree data structure, and repeating said searching in the child node.

4. The method of claim 2 further comprising:
    performing said finding the less recently accessed cache memory location in response to receiving a request to store second data from the storage volume in the cache, wherein insufficient free space is available in the cache to store the second data.

5. The method of claim 4 further comprising:
    deleting the entry stored with the smallest counter value;
    storing the second data at the cache memory location;
    storing a second mapping entry comprising a mapping of the storage volume location of the second data to the cache memory location; and
    storing a second counter with the second mapping entry.

6. The method of claim 5 further comprising performing in response to said deleting the entry stored with the smallest counter value:
    incrementing a counter stored in association with a second key entry linked to a node storing the entry with the smallest counter value, wherein the second key entry is stored in a parent of the node storing the entry with the smallest counter value.

7. The method of claim 5 further comprising performing in response to said storing the second mapping entry:
    incrementing a counter stored with the second mapping entry;
    decrementing each counter stored with each of the plurality of mapping entries except the second mapping entry,
    incrementing a counter stored in association with a key entry linked to the first node stored in a second node wherein the second node is a parent of the first node, and
    decrementing each counter stored with each other key entry stored in the second node.

8. The method of claim 1 wherein said incrementing the counter stored with the first mapping entry comprises:
    adding a counter incrementation value to the counter stored with the first mapping entry wherein the counter incrementation value is proportional to a number of entries comprising the plurality of mapping entries.

9. The method of claim 1 wherein said incrementing the counter stored with the first mapping entry comprises setting the counter to a predetermined maximum value.

10. The method of claim 1 further comprising:
    if the second node is not a root node of the tree data structure, then performing defining the second node to be a present node,
        finding a parent node of the present node,
        incrementing a counter stored in association with a key entry linked to the present node stored in the parent node,
        decrementing each counter stored with each other entry stored in the parent node, and
        if the parent node is not the root node of the tree data structure, then defining the parent node to be the present node and repeating said finding, incrementing and decrementing.

11. A system comprising:
    a processor;
    a storage volume coupled to the processor, wherein the storage volume comprises one or more hard disk drives;
    a cache memory coupled to the processor; and
    a memory coupled to the processor and storing instructions executable by the processor, the instructions configured to:
        store a first mapping entry comprising a mapping of a storage volume data location to a cache memory location, wherein
            the first mapping entry is stored in a first node of a tree data structure, and
            the first node of the tree data structure comprises a plurality of mapping entries;
        store data from the storage volume data location at the cache memory location;
        access the data in the cache memory location; and
        in response to said accessing the data in the cache memory location, increment a counter stored with the first mapping entry, decrement each counter stored with each of the plurality of mapping entries except the first mapping entry, increment a counter stored in association with a key entry linked to the first node stored in a second node of the tree data structure wherein the second node is a parent of the first node, and decrement each counter stored with each other key entry stored in the second node.

12. The system of claim 11 wherein the memory stores additional instructions comprising instructions configured to:

find a less recently accessed cache memory location wherein the less recently accessed cache memory location is associated with a mapping entry stored with a smallest counter value as compared to all other mapping entries stored in the tree data structure.

13. The system of claim 12 wherein the instructions configured to find the less recently accessed cache memory location comprise instructions further configured to:

search a third node of the tree data structure for an entry stored with a smallest counter value;

if the third node is a leaf node of the tree data structure, identify the cache memory location stored in the entry; and if the third node is not a leaf node of the tree data structure, identify the key in the entry, follow the key to a child node of the tree data structure, and repeat said searching in the child node.

14. The system of claim 12 wherein the memory stores additional instructions comprising instructions configured to:

perform said finding the less recently accessed cache memory location in response to receiving a request to store second data from the storage volume in the cache, wherein insufficient free space is available in the cache to store the second data;

delete the entry stored with the smallest counter value;

store the second data at the cache memory location;

store a second mapping entry comprising a mapping of the storage volume location of the second data to the cache memory location; and store a second counter with the second mapping entry.

15. The system of claim 14 further comprising additional instructions performed in response to said storing the second mapping entry, the additional instructions configured to:

increment a counter stored with the second mapping entry;

decrement each counter stored with each of the plurality of mapping entries except the second mapping entry, increment a counter stored in association with a key entry linked to the first node stored in a second node wherein the second node is a parent of the first node, and decrement each counter stored with each other key entry stored in the second node.

16. The system of claim 11 comprising the memory storing additional instructions further configured to:

determine if the second node is a root node of the tree data structure; and if the second node is not a root node of the tree data structure, then
define the second node to be a present node,
find a parent node of the present node,
increment a counter stored in association with a key entry linked to the present node stored in the parent node,
decrement each counter stored with each other entry stored in the parent node, and
if the parent node is not the root node of the tree data structure, then define the parent node to be the present node and repeating said finding, incrementing and decrementing.

17. A non-transitory computer-readable medium storing instructions executable by a processor, the instructions comprising:

a first set of instructions configured to store a first mapping entry comprising a mapping of a storage volume data location to a cache memory location, wherein the first mapping entry is stored in a first node of a tree data structure, and the first node of the tree data structure comprises a plurality of mapping entries;

a second set of instructions configured to store data from the storage volume data location at the cache memory location;

a third set of instructions configured to access the data in the cache memory location; and a fourth set of instructions configured to be executed in response to said accessing the data in the cache memory location, the fourth set of instructions configured to increment a counter stored with the first mapping entry, decrement each counter stored with each of the plurality of mapping entries except the first mapping entry, increment a counter stored in association with a key entry linked to the first node stored in a second node wherein the second node is a parent of the first node, and decrement each counter stored with each other key entry stored in the second node.

18. The non-transitory computer-readable medium of claim 17 storing instructions further comprising:

a fifth set of instructions configured to find a less recently accessed cache memory location wherein the less recently accessed cache memory location is associated with a mapping entry stored with a smallest counter value as compared to all other mapping entries stored in the tree data structure.

19. The non-transitory computer-readable medium of claim 18 wherein said fifth set of instructions comprises:

a sixth set of instructions configured to search a third node of the tree data structure for an entry stored with a smallest counter value;

a seventh set of instructions configured to identify the cache memory location stored in the entry if the third node is a leaf node of the tree data structure; and an eighth set of instructions configured to identify the key in the entry, follow the key to a child node of the tree data structure, and repeat said searching in the child node, if the third node is not a leaf node of the tree data structure.

20. The non-transitory computer-readable medium of claim 17 storing instructions further comprising:

a fifth set of instructions configured to determine if the second node is a root node of the tree data structure; and a sixth set of instructions executable if the second node is not a root node of the tree data structure, the sixth set of instructions configured to:
define the second node to be a present node,
find a parent node of the present node,
increment a counter stored in association with a key entry linked to the present node stored in the parent node,
decrement each counter stored with each other entry stored in the parent node, and
if the parent node is not the root node of the tree data structure, then define the parent node to be the present node and repeat the sixth set of instructions.

* * * * *